United States Patent
Olesen et al.

[11] 3,747,096
[45] July 17, 1973

[54] APPARATUS FOR HIGH-FREQUENCY MIXING

[75] Inventors: Finn Olesen, Den Haag, Netherlands; Konrad Benz, Woburn, Mass.

[73] Assignee: Zellweger AG, Uster, Switzerland

[22] Filed: Sept. 20, 1971

[21] Appl. No.: 181,934

[30] Foreign Application Priority Data
Oct. 16, 1970   Switzerland...................... 15327/70

[52] U.S. Cl.................... 343/8, 325/446, 333/10
[51] Int. Cl...................................... G01s 9/44
[58] Field of Search.................... 325/446; 333/10; 343/8

[56] References Cited
UNITED STATES PATENTS
| | | | |
|---|---|---|---|
| 2,909,655 | 10/1959 | Sanner | 325/446 |
| 3,515,993 | 6/1970 | Merriam | 325/446 |
| 2,790,073 | 4/1957 | Curtis | 325/446 |
| 2,943,192 | 6/1960 | Liss | 325/446 |
| 3,437,935 | 4/1969 | Webb | 325/446 |

Primary Examiner—Benjamin A. Borchelt
Assistant Examiner—G. E. Montone
Attorney—Werner W. Kleeman

[57] ABSTRACT

Apparatus for high-frequency mixing which contemplates mixing a first component of a received signal with a first component of a reference signal and a second component of the received signal with a second component of the reference signal, and wherein between the first and second component of the received signal, or the first and second component of the reference signal, or both, there prevails an at least approximately frequency-independent phase difference throughout a given frequency range.

15 Claims, 8 Drawing Figures

APPARATUS FOR HIGH-FREQUENCY MIXING

BACKGROUND OF THE INVENTION

The present invention relates to an apparatus for, high-frequency mixing, and further relates to utilization of the novel and inventive mixing technique of this development.

To obtain Doppler-signals it is already known to mix a received signal, derived from the reflection of a transmitted signal at a moving object or target, with a portion of an oscillator signal from which there has also been derived the transmitted signal.

According to a known Doppler-radar speed measuring device the Doppler-frequency $f_D$ generated by virtue of the relative movement between a signal reflecting object, a vehicle for instance, and the Doppler-radar speed measuring device, can be determined by mixing the received signal resulting from the reflection phenomena and possessing the frequency $f_e = f_0 \pm f_D$ with a portion of the transmitted signal having the frequency $f_0$. The Doppler-frequency $f_D$ is thus proportional to the radial velocity of the reflection object relative to the transmitting antenna of the Doppler-radar speed measuring device. With typically employed mixing techniques the sign of the Doppler-frequency is lost and, therefore, it is not possible to differentiate between approaching and receding reflecting target objects.

When utilizing a double mixer head and when maintaining a given phase difference $\alpha$ between the components of a received signal participating in mixing and between the components of a reference signal serving for mixing, the signals resulting from mixing and possessing a differential frequency between the received signal and the reference signal also possess the same phase difference $\alpha$ with respect to one another. The sign of this phase difference is determined by the radial directional sense of the relative movement.

Evaluation of the reflected signal is simplified if $\alpha$ is chosen equal to 90°. Examples of this are known in the art as demonstrated, for instance, by H.P. Kalmus, in his article "Direction Sensitive Doppler Device," Proc. IRE, Vol. 43, pages 698 - 700, June 1955; G. Hormann, "Die Radar-Verkehrssonde RVS-1," TelefunkenZeitung Telefunken-Publication, 39(1966)H. 2, pages 175-186, and S.H. Logue, "Measuring Rate-of-Climb by Doppler Radar," Electronic Industries and Tele-Tech, 1956 Oct., pages 74–75, 146–149.

With the apparatuses described in the aforementioned publications there is used a combination transmitter-receiver antenna. To obtain the desired 90°-phase displacement different techniques are utilized. Yet, what is common to all these techniques is that the phase displacement of the received- and/or reference signals is produced by differences in the transit time of the received- and/or reference signals. However, such are frequency-dependent in a given waveguide system. A given arrangement therefore only fulfills the condition of 90°-phase displacement throughout a very narrow frequency range. Furthermore, it is extremely difficult to adjust optimum amplitude- and phase conditions necessary for the faultless operation of such mixer, as such is necessary for instance upon replacement of a transmitter (for example a Klystron) or during required frequency changes.

SUMMARY OF THE INVENTION

Therefore, there is still present a real need in the art for novel apparatus for high-frequency mixing which is not associated with the aforementioned drawbacks of the prior art techniques and equipment. Hence a primary object of this invention concerns fulfilling this need in the art.

Another and more specific object of this invention relates to the provision of a novel apparatus for wideband mixing of high-frequency signals.

Yet a further object of this invention relates to the utilization of the invention especially for Doppler-radar speed measurements wherein undesired Doppler-signals emanating from reflecting target objects and possessing a direction of movement opposite to the target object, namely the vehicle being monitored, are separated out.

Now in order to implement these and still further objects of the invention which will become more readily apparent as the description proceeds, the invention contemplates mixing a first component of a received signal with a first component of a reference signal and a second component of the received signal with a second component of the reference signal, an at least approximately frequency-independent phase difference existing between the first and the second components of the received signal and/or between the first and second components of the reference signal throughout a given frequency range.

The invention specifically relates to novel apparatus for high-frequency mixing. To that end, apparatus suitable for carrying out the aspects of this development comprises a waveguide system terminated by a double mixer head. The waveguide system is connected with a first coupler of an oscillator and also with A signal antenna. Asignal received from the antenna is divided at the double mixer head into a first component and a second component having a predetermined phase relationship between both of the aforesaid components of the received signal. Additionally, a portion of an oscillator signal is guided via the first coupler to a reflecting element provided at the waveguide system. The portion of the oscillator signal reflected at the reflecting element is used as a reference signal and divided, at a second coupler of the waveguide system, into a first component and a second component of such reference signal. Both components of the reference signal are transmitted via the waveguide system to the double mixer head in a manner that a given phase relationship exists between both components of the reference signal at the double mixer head. The aforementioned predetermined phase relationships, on the one hand, between both components of the received signal and, on the other hand, between both components of the reference signal at the mixer head, are at least approximately frequency-independent within a given frequency range.

Additionally, this invention also concerns the use of the aforesaid inventive method in a Doppler-radar speed measuring apparatus for evaluating Doppler-signals which are dependent upon directional sense.

BRIEF DESCRIPTION OF THE DRAWINGS

The invention will be better understood and objects other than those set forth above, will become apparent when consideration is given to the following detailed description thereof. Such description makes reference to the annexed drawings wherein.

Figure 1:
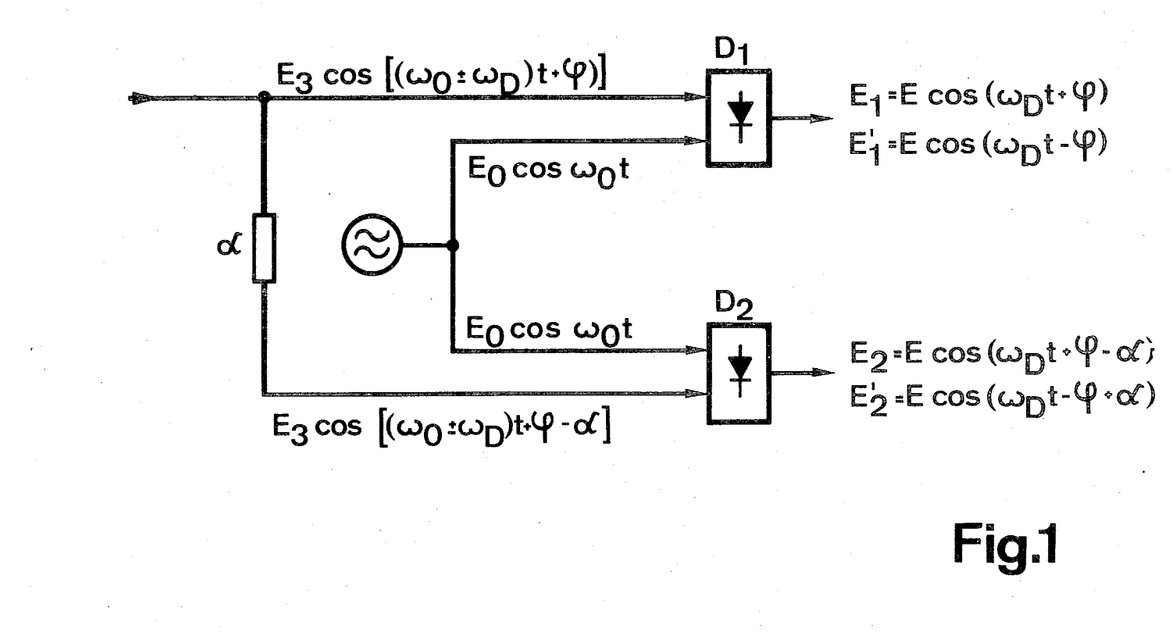
FIG. 1 schematically illustrates the principles of the mixing operation by means of a double mixer or mixing head.

DETAILED DESCRIPTION OF THE PREFERRED EMBODIMENTS:

Considering now the invention in its more specific aspects, and assuming that the reference signal, in other words, the auxiliary signal serving for mixing with the received signal, is defined by $E_o \cos \omega_o t$ and the received signal at the first diode $D_1$ of a double mixing head by $E_3 \cos[(\omega_o \pm \omega_D)t + \phi]$, and the received signal at the second diode $D_2$ of the double mixing head by $E_3 \cos[(\omega_o \pm \omega_D)t + \phi - \alpha]$, then as a result of the mixing operation there appear the following output signals:

a. At the reflection object approaching the radar device:

at diode $D_1$: $E_1 = E.\cos(\omega_D t + \phi)$ at diode $D_2$: $E_2 = E.\cos(\omega_D t + \phi - \alpha)$ b. At the reflection object receding from the radar device:

at diode $D_1$: $E_1{}^1 = E.\cos(\omega_D t - \phi)$ at diode $D_2$: $E_2{}^1 = E.\cos(\omega_D t - \phi + \alpha)$ wherein, $\omega_o$ = the circuit frequency of the transmitted- and reference signal;

$\omega_o + \omega_D$ = the circuit frequency of the received signal when the reflection object approaches the radar device;

$\omega_o - \omega_D$ = the circuit frequency of the received signal when the reflection object recedes or moves away from the radar device; and $\omega_D$ = circuit frequency of the Doppler-signal.

FIG. 1 illustrates the principles of mixing with a double mixing head. The phase advance or phase lag of the output signal of the second diode $D_2$ with respect to the output signal of the first diode $D_1$ of the double mixing head therefore characterizes the directional sense of the relative movement of the reflection object with respect to the Doppler-radar device. Hence there exists a fixed relationship between the phase position of both output signals of the double mixing head with regard to the directional sense of the movement of the reflecting target object. If the phase position of the reference signal of one mixing head is rotated through 180° then the phase relationship of both output signals also changes by 180°. The single situation where a reflection object moves past a radar device at a constant spacing therefrom is not here taken into account inasmuch as no Doppler-effect then arises as is well-known.

Figure 7:
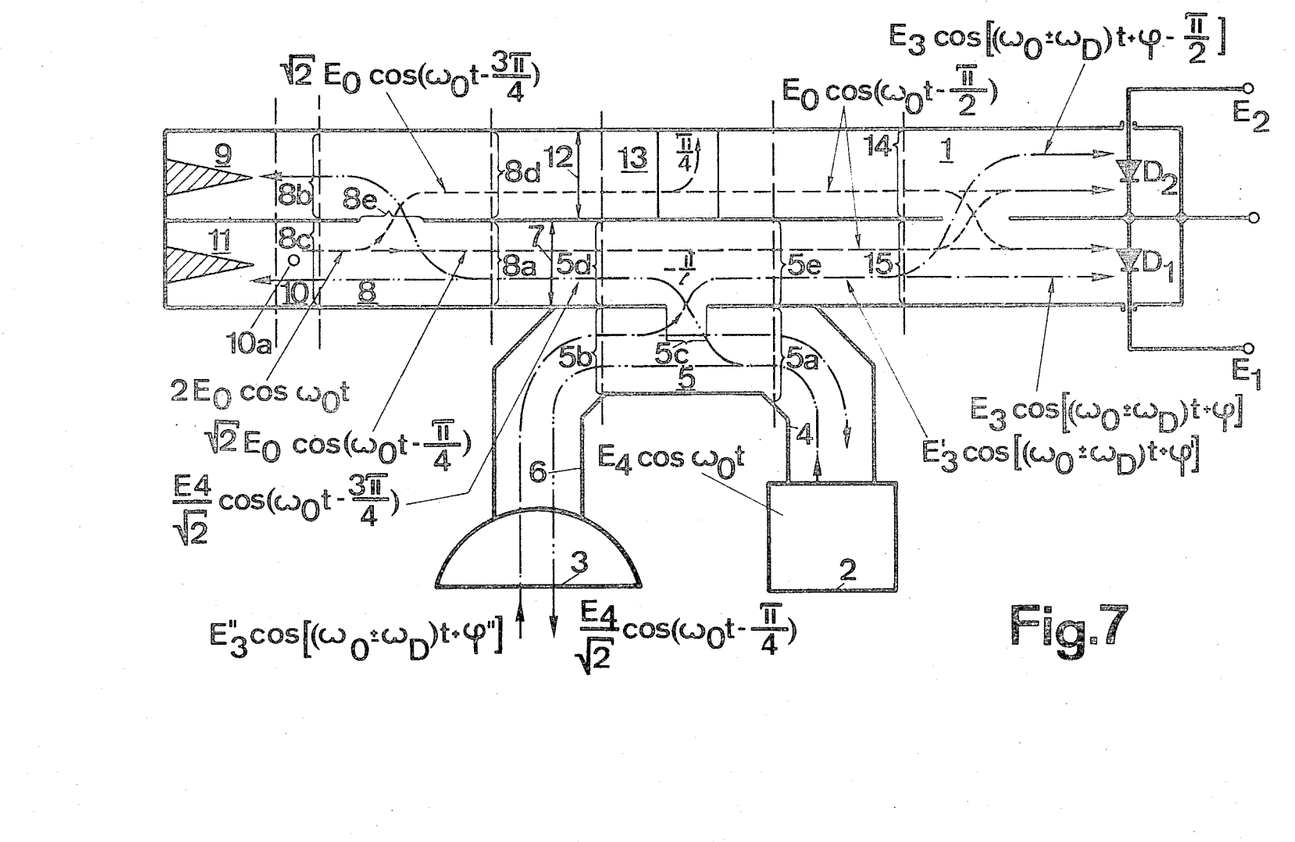
FIG. 7 illustrates a first embodiment of the invention.
Figure 8:
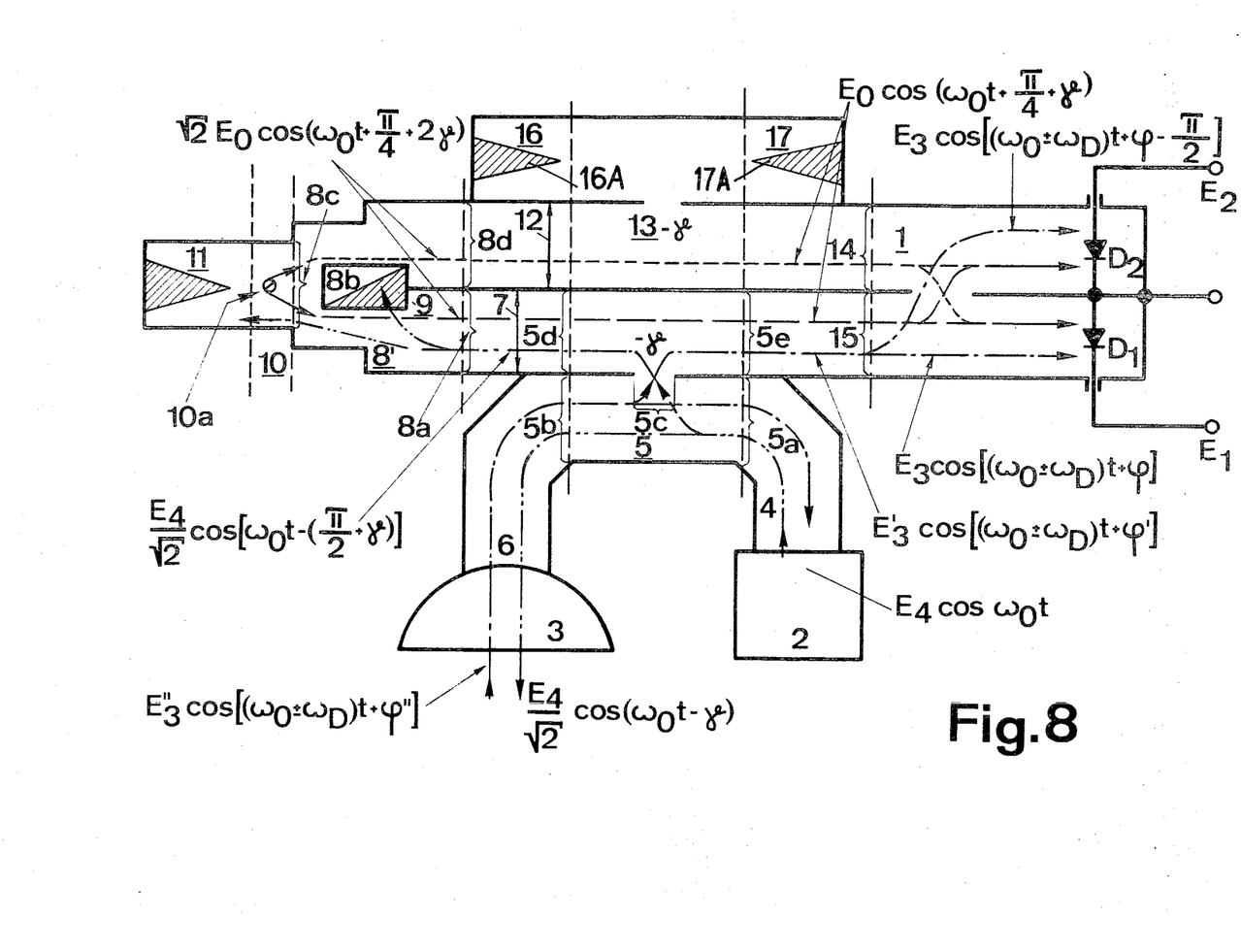
FIG. 8 illustrates a second embodient of the invention.

In conjunction with the description of FIGS. 2 to 5 there will be initially discussed a number of typical systems components, and thereafter in connection with FIG. 7 a first embodiment of the invention where such components are used, and then in conjunction with FIG. 8 a second inventive embodiment where such components are used.

The exemplary embodiments serving to explain the inventive concepts have been conveniently described in conjunction with waveguide technology. Equivalent solutions with equivalent components and arrangements are, of course, possible for the coaxial line technology or strip line technology. Therefore it is to be expressly understood that for all of these equivalent technological solutions or embodiments there is used in this description as a generic designation the term "waveguide."

The components employed in the exemplary embodiments are well known in the art. In this connection reference can be made for instance, to the following publications: H.J. Riblet, "The Short-Slot Hybrid Junction," Proc. IRE 40(1952) pages 180 to 184, also to, I. Lucas, "Allgemeine Theorie des Kurzschlitz-Richt-kopplers," Archiv der el. Uebertragung, 21(1967), Volume 7, pages 339 to 344; and A.F. Harvey, "Microwave Engineering," Academic Press, London 1963, pages 115 to 119.

With a 3 db-short-slot hybrid junction or coupler (FIG. 2) a signal delivered into the arm A is divided by a respective one-half of the input power at both output arms B and C. Both output signals, at the same spacing from the coupler slot, possess a phase position differing by 90°.

Figure 2:
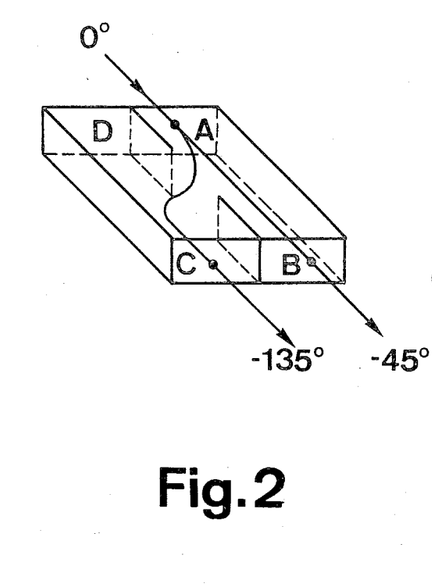
FIG. 2 is a perspective view of a sidewall-coupler.

With a sidewall coupler according to FIG. 2, the signal in arm C lags in phase by an angle of 90° the signal in arm B, and the signal in arm B after having passed through the coupler possesses a phase which lags by 45° in comparison to a signal which has moved through a linear waveguide of the same cross-section and the same length.

With a topwall-coupler the signal in arm C leads in phase by 90° the signal in arm B, and the signal in arm B after passing through the topwall coupler possesses a phase which leads by 45° in comparison with a signal which has moved through a linear waveguide of constant cross-section and constant length.

Figure 3:
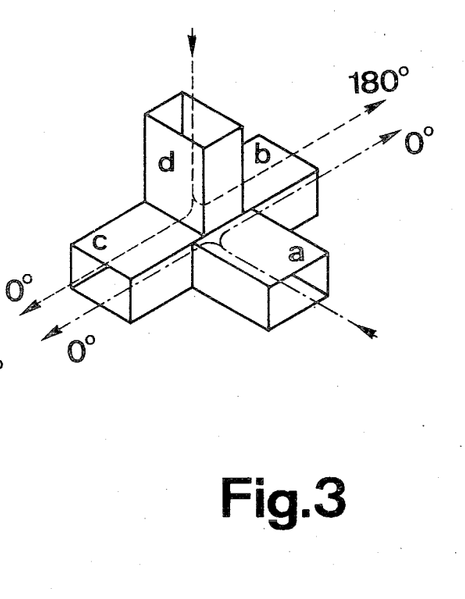
FIG. 3 is a perspective view of a magic-T coupler or hybrid junction.

With a "magic tee" or hybrid junction as shown in FIG. 3 a signal supplied to arm $a$ (H-arm) is divided with regard to a respective one-half of its power at both arms $b$ and $c$, both output signals are in-phase. A signal supplied to the arm $d$ (E-arm) is divided with regard to a respective one-half of its power at both arms $b$ and $c$, both output signals possessing a phase difference of 180° with respect to one another.

Figure 4:
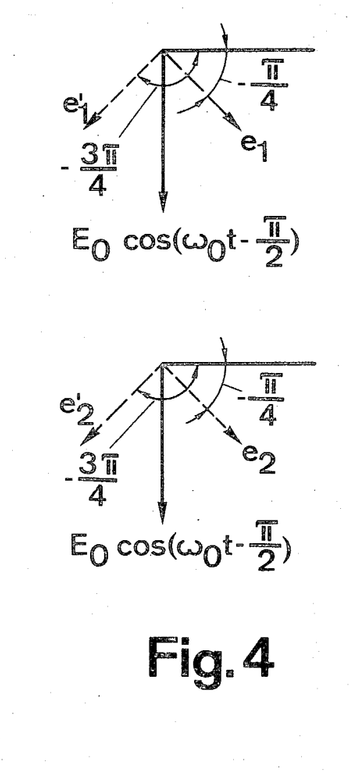
FIG. 4 illustrates an exemplary use of a 3 db-short slot-hybrid junction.

With the 3 db-short-slot coupler of FIG. 4 it is to be noted one-half $E_o \cos \omega_o t$ of the signal of the coupler is delivered through the arm A and the other half $E_o \cos \omega_o t$ to the arm D. This signal, on the one hand, reaches the arm B in two partial components, namely a partial component $e_1 = (E_o/\sqrt{2}).\cos[\omega_o t - (\pi/4)]$ traveling from A to B (see FIG. 4) and a partial component defined by $e_1{}^1=(E_o/\sqrt{2}).\cos[\omega_o t-(3\pi/4)]$ traveling from D to B. On the other hand, this signal likewise arrives at the arm C in two components, namely a partial component $e_2{}^1=(E_o/\sqrt{2}).\cos[\omega_o t-(3\pi/4)]$ traveling from A to C and a partial component $e_2=(E_o/\sqrt{2}).\cos[\omega_o t-(\pi/4)]$ traveling from D to C. Both partial components of the signal in each instance combine at each arm B and C into a resultant component $E_o.\cos[\omega_o t-(\pi/2)]$. The phase position of both resultant components is thus the same.

If the delivery of both signals occurs in phase opposition then two opposite phase signals will also appear at both output arms B and C.

With these considerations, as well as with the further considerations, the phase rotations of the signals in the waveguide governed by the transit time have not been taken into account since, if the system is symmetrically constructed, they can be neglected.

Figure 5:
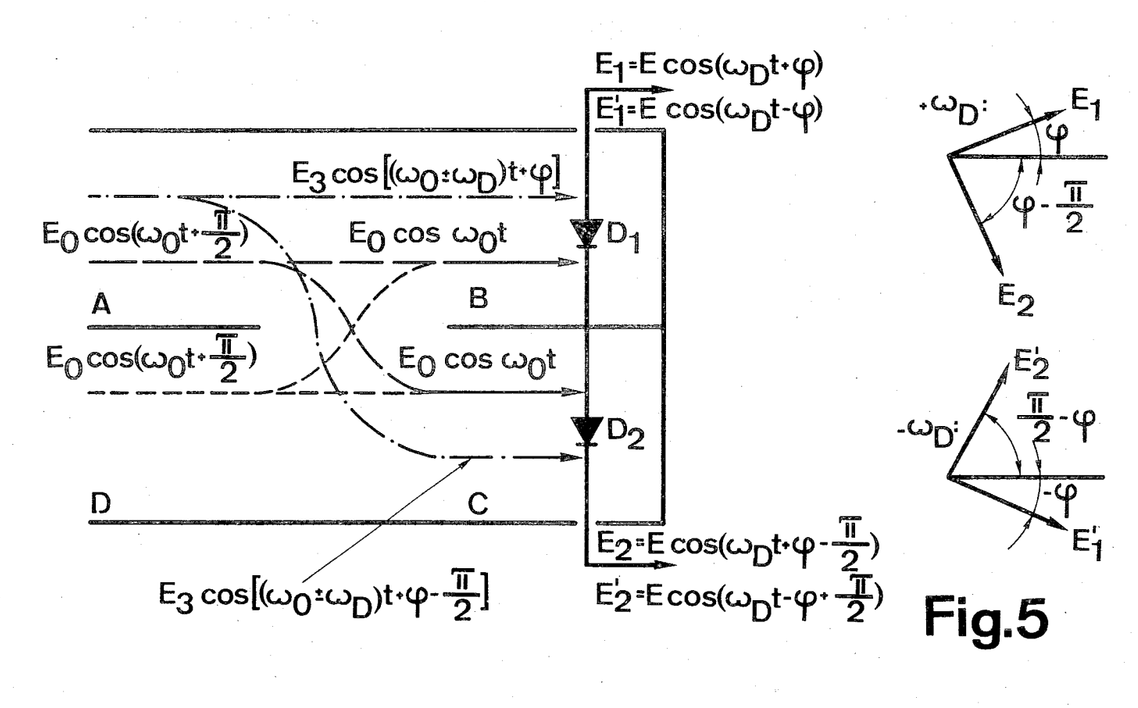
FIG. 5 illustrates the signal- and phase relationships in a double mixing head.

Now, if according to the system of FIG. 5 there is connected to the arms B and C of a sidewall coupler a respective diode support with a diode $D_1$ and diode $D_2$, then there is formed a double mixer or mixing head.

As best seen by referring to FIG. 5 the received signal is delivered through arm A to the double mixing head and owing to the presence of the coupling slot a respective one-half thereof arrives as component $E_3\cos[-(\omega_o\pm\omega_D)t+\phi]$ at the diode $D_1$ and as component $E_3\cos[-(\omega_o\pm\omega_D)t+\phi-(\pi/2)]$ at the diode $D_2$. The phase position of both received signals thus differ by 90° at both mixing diodes $D_1$ and $D_2$.

The reference signal, for instance $E_o.\cos[\omega_o t+(\pi/2)]$ is delivered with the same amplitude and phase at both input Arms A and D of the double mixing head. Therefore, the resultant reference signals $E_o\cos\omega_o t$ at both mixing diodes $D_1$ and $D_2$ possess the same amplitude and phase.

The Doppler-signals obtained by mixing are thus characterized at the diode $D_1$ by $E_1=E.\cos(\pm\omega_D t+\phi)$ and at the diode $D_2$ by $E_2=E.\cos[\pm\omega_D t+\phi-(\pi/2)]$. These phase relationships have been illustrated in FIG. 5.

The mixing head of FIG. 5 is wideband, that is, the explained phase relationships are fulfilled for frequencies of all signals in a wideband, for instance from 9.4 GHz to 10.8 GHz, with practically sufficient accuracy without any post-matching of the waveguide elements.

Figure 6:
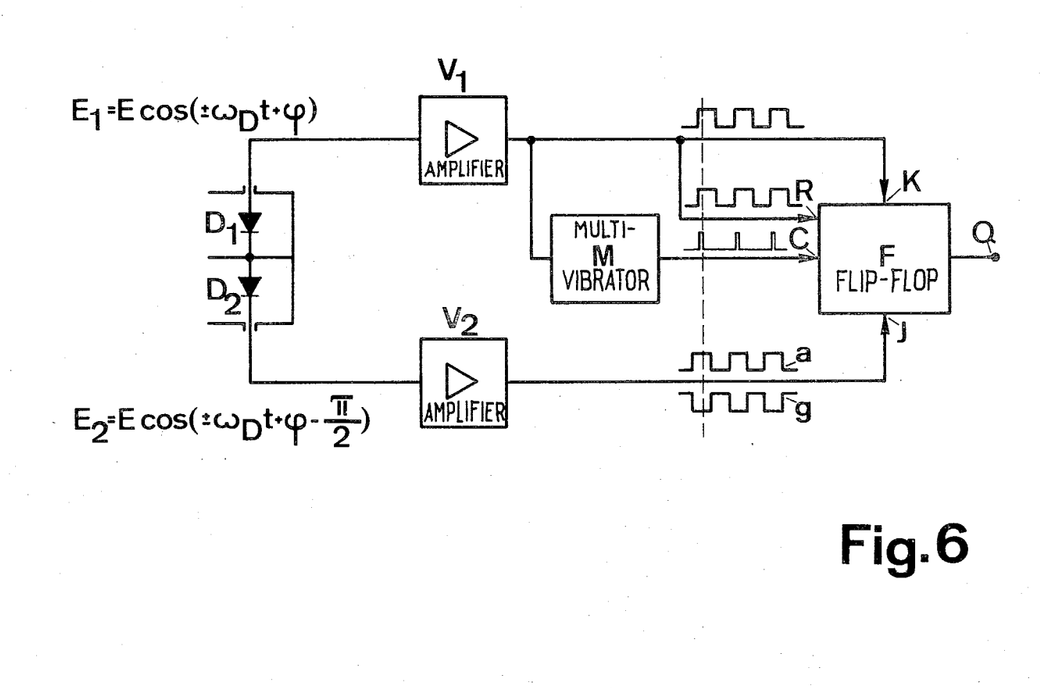
FIG. 6 is a block circuit diagram of an evaluation circuit for the phase position of Doppler-signals.

Evaluation of the phase position of the Doppler-signals obtained in connection with the description of the system of FIG. 5 and for determining the radial directional sense of a reflecting target object can be performed, for instance, by means of the circuitry illustrated in FIG. 6.

The Doppler-signals resulting from mixing and appearing at the diodes $D_1$ and $D_2$, after amplification and limiting at the amplifiers $V_1$ and $V_2$ respectively, are delivered to the inputs K and J respectively of a flip-flop F of known construction, the reset input R of this flip-flop F being connected parallel to the K-input.

The output signal of the amplifier $V_1$ also supplies a standard monostable multivibrator M, the output of which is electrically coupled with the clock-input C of flip-flop F. The descending flank of a pulse produced at the multivibrator M arrives at the clock-input C of the flip-flop F immediately following arrival of the positive flank of a Doppler-signal at the K-input.

With outflowing traffic $(-\omega_D)$ the Doppler-signal of the diode $D_2$ and thus the output signal $a$ of the amplifier $V_2$, in relation to that of the diode $D_1$, and thus the amplifier $V_1$, leads by 90°. When the flip-flop F is triggered by a clock pulse or signal there are present positive signals at all three inputs J, K and R of the flip-flop F, and at the output Q of flip-flop F there appears a positive output signal, provided that the signal at the output Q was previously null.

This output signal again disappears when the reset signal passes through the value null or zero. Therefore, at the output Q there appears a square wave signal, the frequency of which coincides with that of the Doppler-signal.

During oncoming traffic $(+\omega_D)$ the Doppler-signal of the diode $D_2$ lags by 90° that of the diode $D_1$. Thus, the signal $g$ appearing at the input J of the flip-flop F is always negative upon the arrival of a clock signal, consequently no output signal can appear at the output Q.

FIG. 7 illustrates a first embodiment of the invention employing a double mixing head 1 of the type previously considered. The waveguide system illustrated in FIG. 1 serves to divide both an oscillator signal $E_4\cos\omega_o t$ of an oscillator 2 as well as also a signal $E_3{}''\cos[(\omega_o\pm\omega_D)t+\phi'']$ received from a transmitter-receiver antenna 3, so as to form, on the one hand, a transmitted signal and, on the other hand, the components of the reference signal and the received signal required for the mixing operation.

The oscillator 2 is connected via a waveguide bend 4, for instance a 90°-bend, with an arm 5a of a hybrid junction or coupler 5. By means of a further waveguide bend 6, for instance, a 90°-bend, the transmitter-receiver antenna 3, which is of known construction, is connected with a further arm 5b of the hybrid junction 5. By means of the coupler slot 5c of this hybrid junction the oscillator signal $E_4\cos\omega_o t$ is divided into a transmitted signal $(E_4/\sqrt{2})\cos[\omega_o t-(\pi/4)]$ and a reference signal defined by $(E_4/\sqrt{2})\cos[\omega_o t-(3\pi/4)]$. The reference signal leaves the hybrid junction by means of the arm 5d and travels through a first branch 7 of the waveguide system towards the left to a second coupler 8. In the first embodiment under consideration the second coupler 8 is likewise a hybrid jucntion or coupler of known construction.

The reference signal $(E_4/\sqrt{2})\cos[\omega_o t-(3\pi/4)]$ travels through the second coupler 8 from the right towards the left and is thus divided into two components. The one component leaves the second coupler 8 by means of its arm 8b and is absorbed at a suitable reflection-poor terminating element 9 connected after the second coupler 8. The other component leaves the second coupler 8 by means of its arm 8c and arrives at a reflecting element 10 connected after this coupler.

Within the reflecting element 10 there is arranged a reflection adjustment member 10a, for instance an adjustable screw, extending into the reflection element 10. Connected after the reflecting element 10 is a terminating element 11 which is reflection-poor. At this reflection-poor terminating element 11 there is absorbed that portion of the reference signal which has not been reflected by the reflection element 10.

A reflected reference signal, which can be defined by $2E_o\cos\omega_o t$ departs from the right of the reflecting element 10 and enters the arm 8c of the previously mentioned hybrid junction or coupler 8 and there is then sub-divided into two components of the reference signal.

The one component $\sqrt{2}.E_0.\cos[\omega_0 t-(\pi/4)]$ of this reference signal enters to the right of the arm 8a into the first branch 7 of the waveguide system with a relative phase position of −45°. The other component $\sqrt{2}.E_0.\cos[\omega_0 t-(3\pi/4)]$ of this reference signal enters from the right of arm 8d into the second branch 12 of the waveguide system with a relative phase position of −135°. At the right end of the first branch 7 and the second branch 12 of the waveguide system there is connected the previously described double mixing head 1.

The component of the reference signal departing from the arm 8a of the hybrid coupler 8 and entering at the right into the branch 7 of the waveguide system possesses, at that location, a relative phase position of −45°. During passage through the hybrid junction or coupler 5 its phase is rotated through a further −45° so that the relative phase position at the right-end of the branch 7 at location 15 amounts to −90°.

Upon passing through a 3 db-hybrid junction 5 the power or energy in the branch 7 is also reduced by one-half, so that the reference signal at location 15 is defined by $E_0.\cos[\omega_0 t-(\pi/2)]$.

In order that the signal traveling through the branch 12 possesses the same phase and amplitude at location 14, it is necessary during passage through the path from 8d to 14 to reduce the power by one-half and the phase must be rotated by +45°. Such a dampening- and phase rotating element 13 can be, for instance, a 3 db topwall coupler, the auxiliary arms of which are each provided with a reflection-poor terminating element or terminator. After passing through such coupler the reference signal at location 14 can be defined by the function $E_0.\cos[\omega_0 t-(\pi/2)]$.

In the exemplary embodiment of FIG. 7 two similar phase components $E_0.\cos[\omega_0 t-(\pi/2)]$ of the reference signal derived from the oscillator signal are delivered to the double mixing head 1.

The portion of the transmitted signal reflected by a reflecting object at the radiating zone of the antenna 3 and received by such antenna characterises the received signal defined by $E_3''\cos[(\omega_0 \pm \omega_D)t+\phi'']$. A portion of the received signal moves from the arm 5b through the coupling slot 5c and arrives at the arm 5e of the hybrid junction or coupler 5 and therefore at the branch 7 of the waveguide system. At location 15 of this branch 7 a received signal $E_3'\cos[(\omega_0 \pm \omega_D)t+\phi'']$ enters the double mixing head. Also this received signal is sub-divided in the double mixing head 1 into two components $E_3\cos[(\omega_0 \pm \omega_D)t+\phi]$ and $E_3.\cos[(\omega_0 \pm \omega_D)t+\phi-(\pi/2)]$. The component $E_3\cos[(\omega_0 \pm \omega_D)t+\phi]$ delivered to the diode $D_1$ possesses the relative phase position 0°, whereas the component $E_3.\cos[(\omega_0 \pm \omega_D)t+\phi-(\pi/2)]$ delivered to the diode $D_2$ possesses the relative phase position −90°.

Therefore, at the diodes $D_1$ and $D_2$ a respective component of the two components of a received signal $E_3''.\cos[(\omega_0 \pm \omega_D)t+\phi'']$ obtained by reflection and a respective component of the two components of a reference signal $2E_0\cos\omega_0 t$ obtained from the oscillator signal $E_4.\cos\omega_0 t$ are mixed, whereby between both components of the received signal there exists a defined phase displacement, namely 90°, and whereby both components of the reference signal coincide in phase.

It is also possible to deliver in phase both components of the received signal to the mixing head, in which case then both components of the reference signal must be phase displaced with respect to one another. Finally, it is also possible for both components of the received signal as well as also both components of the reference signal to be phase displaced with respect to one another by a defined angle.

It is an essential aspect of the present invention that the phase- and amplitude relationships of the signals appearing in the double mixing head are governed by the selection of the components of the waveguide system and their arrangements and not by transit time differences in the waveguide system. Consequently, the phase relationships required for the practice of the inventive method are frequency-independent throughout a predetermined frequency range, for instance from 9.4 to 10.8 GHz.

Both of the Doppler-signals $E_1=E.\cos(\pm\omega_D t+\phi)$ and $E_2=E.\cos[\pm\omega_D t+\phi-(\pi/2)]$ resulting from the two mixings of the aforesaid signals at the diodes $D_1$ and $D_2$ (FIG. 5), from what has been previously discussed, possess a defined phase position with respect to one another. Thus the phase position of a received signal from a reflecting target object approaching the radar device is different in a defined manner from the phase position of a received signal from a reflecting target object moving away from the radar device.

By taking into account this phase position of both Doppler-signals $E.\cos(\pm\omega_D t+\phi)$ and $E.\cos[\pm\omega_D t+\phi-(\pi/2)]$ it is thus possible to determine and/or evaluate the radial directional sense of movement of the reflecting target object.

The evaluation of this phase position for determining the radial directional sense of movement of the reflecting target object can be undertaken, for instance, in the manner described previously in conjunction with FIG. 6.

The apparatus described in connection with FIG. 7 manifests itself by virtue of the features that, in a very simple manner, namely by only adjusting the adjustment element 10a at the reflecting element 10 it is possible to regulate the reference signal peak most favorable for the optimum operational mode of the double mixing head, whereby there are automatically guaranteed the correct phase relationships of the signal or signal components employed for mixing. Additionally, it is particularly advantageous that the optimum amplitude- and phase relationships are not adversely influenced even when changing the frequency of the oscillator 2 within a relatively wideband, owing to the dividing of the signal and phase relationships brought about by virtue of the particular construction of the inventive apparatus.

FIG. 8 illustrates a second embodiment of the invention. Also in this embodiment there is employed a double or twofold mixing head of the type described. In order to form and deliver a reference signal emanating from the oscillator signal $E_4\cos\omega_0 t$ as well as for the purpose of delivering a portion of the received signal $E_3''\cos[(\omega_0 \pm \omega_D)t+\phi'']$ there is here also provided a coupler 5, for instance a hybrid coupler or junction.

The phase angle γ (FIG. 8) hereby designates a characteristic phase rotation of the coupler brought about by the coupling slot and matching elements. Also in this second embodiment the phase- and amplitude relationships of the signals appearing at the double mixing head are determined by the selection and arrangement of the employed waveguide components and not by differences in transit or traveling time in the waveguide system.

The oscillator signal $E_4\cos\omega_o t$ is sub-divided in the coupler 5 into a transmitted signal $(E_4/\sqrt{2})\cos(-\omega_o t-\gamma)$ and into a reference signal $$\frac{E_4}{\sqrt{2}}\cos\left[\omega_o t-\left(\frac{\pi}{2}+\gamma\right)\right]$$

. The reference signal departs from the coupler 5 by means of an arm 5d and travels through a first branch 7 of the waveguide system towards the left to a second coupler, which in this embodiment is a folded magic-T coupler 8' of known construction. In this magic-T coupler 8' the reference signal is divided into two equal components or portions. A part of this reference signal travels to the arm 8b and is absorbed in a subsequently connected reflection-poor terminating element or terminator 9 of known construction. Another part of such reference signal travels through the aforesaid magic-T coupler 8', leaving such at the arm 8c. This portion of the reference signal passes through a reflecting element 10 connected after the magic-T coupler 8'. Within the reflection element 10 there is located a reflection adjustment member 10a, again for instance an adjustable screw which extends into the confines of the reflecting element 10. A reflection-poor terminator or terminating element 11 i.e. a virtually reflexionless terminating element is connected after the reflecting element 10, and at which there is absorbed the portion of the reference signal not reflected by the reflecting element 10.

A reflected reference signal departs from the reflection or reflecting element 10 and enters to the right of the arm 8c of the magic-T coupler 8' and there is divided into two components of the reference signal.

The one component of the reference signal departs from arm 8a and enters towards the right into the first branch 7 of the waveguide system. The other component of the reference signal departs from arm 8d and enters towards the right into the second branch 12 of the waveguide system. Both components are similar in phase and amplitude and are defined by $\sqrt{2}\,E_o\cos[\omega_o t+(\pi/4)+2\Gamma]$. At the right end of the first branch 7 and the second branch 12 of the waveguide system there is connected the previously described mixing head 1.

Upon passing through the hybrid junction or coupler 5 the phase of the component of the reference signal departing from the arm 8a of the magic-T coupler 8' and entering at the right into the branch 7 of the waveguide system is rotated through the angle $-\gamma$, so that the phase position at the right end of the branch 7 at location 15 amounts to $[(\pi/4)+\gamma]$.

Upon passing through a 3 db-hybrid coupler 5 the energy in the branch 7 is also reduced to one-half so that the reference signal at location 15 is defined by $E_o\cos[\omega_o t+(\pi/4)+\gamma]$.

In order that the signal traveling through the branch 12 possesses the same phase and amplitude at location 14 it is necessary upon passing through the path 8d-14 to reduce the energy by one-half and to rotate the phase through the angle $-\gamma$. Such a dampening and phase rotating element 13 can preferably be a 3 db-hybrid junction or coupler of the same construction as the coupler 5, the auxiliary arms 16 and 17 of which are equipped with a respective reflection-poor i.e. virtually reflexionless terminating element or terminator 16a and 17a as shown. After passing through such coupler the reference signal at location 14 is likewise defined by $E_o\cos[\omega_o t+(\pi/4)+\gamma]$.

With the embodiment of FIG. 8 there is thus delivered to the double mixing head 1 two similar phase components, namely $E_o\cos[\omega_o t+(\pi/4)+\gamma]$ of the reference signal derived from the oscillator signal. These two components of the reference signal at the diodes $D_1$ and $D_2$ can therefore be defined by $E_o\cos\omega_o t$.

The portion of the transmitted signal reflected by a reflecting target object at the radiating zone of the antenna 3 and received by such antenna characterizes the received signal, namely $E_3''\cos[(\omega_o\pm\omega_D)t+\phi'']$. A portion of the received signal moves from the arm 5b through the coupling slot 5c to the arm 5e of the coupler 5 and therefore into the branch 7 of the waveguide system. At the location 15 of this branch 7 a received signal $E_3'\cos[(\omega_o\pm\omega_D)t+\phi']$ enters the double mixing head 1. The received signal is sub-divided at the double mixing head 1 into two components, namely $E_3\cos[(\omega_o\pm\omega_D)t+\phi]$ and $E_3\cos[(\omega_o\pm\omega_D)t+\phi-(\pi/2)]$. The component $E_3\cos[(\omega_o\pm\omega_D)t+\phi]$ delivered to the diode $D_1$ possesses the relative phase position 0°, whereas the component $E_3\cos[(\omega_o\pm\omega_D)t+\phi-(\pi/2)]$ delivered to the diode $D_2$ possesses the relative phase position $-90°$.

Therefore at the diodes $D_1$ and $D_2$ there is mixed a respective one of two components of a received signal $E_3''\cos[(\omega_o\pm\omega_D)t+\phi'']$ which was obtained by reflection and a respective one of two components of a reference signal derived from the oscillator signal $E_4\cos\omega_o t$, wherein a defined phase displacement, namely $-90°$ exists, between both components of the received signal and wherein both components of the reference signal coincide in phase and in amplitude.

Both of the Doppler-signals $E_1=E\cos(\pm\omega_D t+\phi)$ and $E_2=E\cos[\pm\omega_D t+\phi-(\pi/2)]$ resulting from both mixings of the mentioned signals at the diodes $D_1$ and $D_2$ exhibit, from what has been previously stated, a defined phase position with respect to one another. In this connection, the phase position of a received signal from a reflecting target object approaching the radar device is different in a defined manner with respect to the phase position of a received signal from a reflecting target object moving away from the radar device. By taking into account this phase position of both Doppler-signals $E\cos(\pm\omega_D t+\phi)$ and $E\cos[\pm\omega_D t+\phi-(\pi/2)]$ it is therefore possible to determine and evaluate the radial sense of movement of the reflection object.

The evaluation of this phase position for determining the radial directional sense of the reflecting target object can be undertaken, for instance, in accordance with the techniques previously described in conjunction with FIG. 6.

With Doppler-radar speed measuring devices it is required for their orderly operation that from time to time the oscillator, for instance a Klystron, be exchanged. It can also happen that the oscillator signal must be adjusted to a different rated frequency. The previously described invention possesses the advantage that through adjustment of the reflecting member 10a at the reflecting element 10 it is possible at the mixing head to very easily adjust the energy conditions of the reference signals required for optimum operations, without, by virtue of such adjustments of the reflecting element 10, there occurring a change in the relative phase positions of the individual components which could affect the proper functioning of the apparatus.

It is of course to be understood that further modifications of the invention are possible within the concepts of this development. For instance the magic-T coupler 8' can be replaced by a 4.8 db hybrid junction or coupler, whereby then at the waveguide branch 12 the coupler 13 is then replaced by a preferably wideband phase shifter of conventional design.

It is also possible to deliver to the mixing head both components of the received signal similar in-phase, whereby then both components of the reference signal must be phase-displaced with respect to one another. Finally, it is also possible for both components of the received signal as well as both components of the reference signal in each case to be phase displaced with respect to one another through a defined angle.

While there is shown and described present preferred embodiments of the invention, it is to be distinctly understood that the invention is not limited thereto but may be otherwise variously embodied and practiced within the scope of the following claims. Accordingly,

What is claimed is:

1. An apparatus for mixing high-frequency signals, comprising a waveguide system, a double mixer head terminating said waveguide system, an oscillator and an antenna, a first coupler for operatively connecting said waveguide system with said oscillator and said antenna, a received signal arriving from said antenna being sub-divided at said twofold mixer head into a first component and into a second component with a predetermined phase relationship existing between both said components of the received signal, a reflecting element and a second coupler provided for said waveguide system, at least a portion of an oscillator signal being guided via said first coupler to said reflecting element, the portion of the oscillator signal reflected at said reflecting element being sub-divided as a reference signal at said second coupler of the waveguide system into a first component of the reference signal and into a second component of the reference signal, both components of said reference signal being delivered via the waveguide system to said double mixer head in such manner that between both components of the reference signal at the double mixer head there exists a predetermined phase relationship, and wherein the said predetermined phase relationship on the one hand between both components of the received signal and on the other hand between both components of the reference signal at the double mixer head is at least approximately frequency-independent within a given frequency range.

2. The apparatus as defined in claim 1, wherein said first coupler of the waveguide system is a hybrid junction.

3. The apparatus as defined in claim 1, wherein a sidewall coupler is connected after said first coupler.

4. The apparatus as defined in claim 3, wherein said double mixer head embodies two diodes, each of which is connected after a respective arm of the sidewall coupler.

5. The apparatus as defined in claim 1, wherein said first coupler is a hybrid junction and serves to couple said oscillator to the waveguide system.

6. The apparatus as defined in claim 1, wherein said second coupler is connected between said first coupler and said reflecting element.

7. The apparatus as defined in claim 6, wherein said second coupler is a hybrid junction.

8. The apparatus as defined in claim 6, wherein said second coupler is a magic-T coupler.

9. The apparatus as defined in claim 1, further including a terminating element poor in reflection arranged after said reflecting element.

10. The apparatus as defined in claim 1, further including a terminating element which is poor in reflection connected after one arm of said second coupler.

11. The apparatus as defined in claim 1, wherein said waveguide system is provided with two branches.

12. The apparatus as defined in claim 11, wherein the first branch connects one arm of said second coupler via said first coupler with an arm of the double mixer head.

13. The apparatus as defined in claim 11, wherein the second branch of the waveguide system connects a further arm of the second coupler via a phase shifting element with a second arm of said double mixer head.

14. The apparatus as defined in claim 12, wherein the phase shifting element is a hybrid junction arranged at the second branch of the waveguide system.

15. The apparatus as defined in claim 1, further including a phase-selective evaluation circuit connected after said double mixer head of the waveguide system.

* * * * *